United States Patent [19]

Furuya et al.

[11] Patent Number: 5,211,148
[45] Date of Patent: May 18, 1993

[54] METHOD OF AND AN APPARATUS FOR CONTROLLING ASSIST AIR IN AN INTERNAL COMBUSTION ENGINE

[75] Inventors: Junichi Furuya; Mitsuru Miyata; Hirokazu Simizu; Toshio Namba, all of Isesaki, Japan

[73] Assignee: Japan Electronic Control Systems Co., Ltd., Isesaki, Japan

[21] Appl. No.: 953,947

[22] Filed: Sep. 30, 1992

[30] Foreign Application Priority Data

Oct. 9, 1991 [JP] Japan ................... 3-262258

[51] Int. Cl.⁵ .......................................... F02M 23/12
[52] U.S. Cl. ................... 123/419; 123/436; 123/585; 123/588
[58] Field of Search ............. 123/339, 406, 419, 436, 123/472, 531, 533, 585, 588

[56] References Cited

U.S. PATENT DOCUMENTS

| 4,465,050 | 8/1984 | Igashira et al. ............. 123/585 X |
| 5,024,201 | 6/1991 | Kobayashi et al. ........... 123/585 X |
| 5,078,112 | 1/1992 | Ikeura ....................... 123/585 X |
| 5,121,716 | 6/1992 | Takahashi et al. ............ 123/531 |
| 5,148,788 | 9/1992 | Saikalis et al. ............. 123/585 X |

FOREIGN PATENT DOCUMENTS

| 232340 | 10/1986 | Japan ................. 123/585 |
| 63-18767 | 5/1988 | Japan . |
| 64-9465 | 2/1989 | Japan . |

Primary Examiner—Tony M. Argenbright
Attorney, Agent, or Firm—Foley & Lardner

[57] ABSTRACT

An apparatus supplies assist air toward an injection nozzle of a fuel injection valve of an internal combustion engine, to atomize an injected fuel. The apparatus starts and stops supplying the assist air according to engine operating conditions while correcting ignition timing or an engine intake air quantity, to thereby suppress fluctuations in engine output.

18 Claims, 7 Drawing Sheets

METHOD OF AND AN APPARATUS FOR CONTROLLING ASSIST AIR IN AN INTERNAL COMBUSTION ENGINE

BACKGROUND OF THE INVENTION (1) Field of the Invention

The present invention relates to a method of and apparatus for controlling assist air that is injected in the vicinity of an injection nozzle of a fuel injection valve, to promote atomization of a fuel injected from the injection nozzle. In particular, the invention relates to a technique of avoiding a fluctuation of engine output when supply of the assist air is started or stopped.

(2) Description of the Related Art

An apparatus for supplying assist air to an internal combustion engine is disclosed in, for example, Japanese Examined Patent Publication No. 64-9465 and Japanese Examined Utility Model Publication No. 63-18767. The conventional assist air supplying apparatus guides a portion of intake air as assist air from an intake passage on the upstream side of a throttle valve toward the vicinity of an injection nozzle of a fuel injection valve located on the downstream side of the throttle valve, to hit and atomize a fuel injected from the fuel injection valve, thereby improving combustion efficiency, reducing fuel consumption, and discharging clean exhausts.

The assist air is effective when the temperature of the engine is too low to properly atomize fuel. Since the assist air unavoidably disturbs the directivity of an injected fuel and increases a minimum intake air quantity, the assist air is unwanted and even harmful once the engine is conditioned to sufficiently atomize the injected fuel without the help of the assist air.

Accordingly, a solenoid valve, for example, is provided to start and stop the supply of assist air. The solenoid valve opens and closes an assist air passage according to engine operating conditions such as engine temperature, to supply the assist air only when needed, for example, when the engine temperature is too low.

When the assist air through the assist air passage is started or stopped, the total quantity of intake air to the engine suddenly fluctuates for the portion of the assist air, and such a sudden fluctuation in the intake air quantity suddenly changes the output torque of the engine and causes a shock.

SUMMARY OF THE INVENTION

To solve the above problem, an object of the present invention is to provide a method of and apparatus for avoiding a shock and a sudden change in the output torque of an engine when assist air is supplied or stopped.

Another object of the invention is to carry out precise control to preventing a sudden change in engine output when assist air is supplied or stopped.

In order to accomplish the objects, a method of and apparatus for controlling assist air in an internal combustion engine according to the present invention employ an assist air passage for guiding part of intake air as assist air and injecting the assist air in the vicinity of an injection nozzle of a fuel injection valve, start and stop supply of the assist air through the assist air passage in response to engine operating conditions, and correct a controlled object related to engine output in a way to suppress a fluctuation in engine output.

Starting or stopping the assist air suddenly changes the total quantity of intake air to the engine for the portion of the assist air. Accordingly, the invention controls the controlled object related to engine output in a way to suppress the fluctuations of engine output caused by the sudden change in the intake air quantity. Namely, the invention controls the controlled object to drop engine output when the assist air is supplied and to increase engine output when the assist air is stopped. In this way, the invention avoids a sudden change in engine output when the total intake air quantity is suddenly changed for the portion of the assist air.

The assist air passage may bypass a throttle valve disposed in an engine intake system, and the assist air may be injected in the vicinity of the injection nozzle of the fuel injection valve by a pressure difference between the upstream and downstream sides of the throttle valve.

In the arrangement mentioned above, the assist air may be supplied in response to an engine's negative suction pressure.

The assist air may be supplied and stopped according to an engine temperature. If the engine temperature is too low to sufficiently atomize an injected fuel, supply of the assist air is started, and after the engine temperature is increased to an extent where no assist air is required, the assist air is stopped.

The control object related to engine output and to be corrected to suppress fluctuations in engine output when supply of the assist air is started or stopped may be ignition timing. The ignition timing may be corrected by correcting an angle of lead or lag, to suppress the fluctuations in engine output.

The ignition timing is corrected before stopping the assist air, to suppress output fluctuations. Namely, the ignition timing is forcibly retarded by a predetermined angle in advance, and the retarded portion is reset to zero when the assist air is stopped, to suppress the fluctuations in engine output.

Retarding the ignition timing beforehand and resetting it to original timing are done by advancing the ignition timing at the time of reset. This ignition timing advancing control is carried out when the assist air is stopped to reduce an intake air quantity. Namely, a fluctuation of engine output due to a change in an intake air quantity caused by the stoppage of the assist air will be canceled by a change of engine output caused by the corrected ignition timing. In this way, the fluctuations in engine output are suppressed.

Instead of the ignition timing, the quantity of intake air to the engine may be corrected to suppress the fluctuations in engine output caused when the assist air is supplied or stopped.

The internal combustion engine may have an auxiliary air passage that is independent of the assist air passage and bypasses the throttle valve disposed in the engine intake system, as well as a control valve for changing, according to operating conditions of the engine, the quantity of auxiliary air supplied to the engine through the auxiliary air passage. In this case, the opening of the control valve is forcibly corrected when the assist air is supplied or stopped, to cancel a change in the quantity of the assist air by a change in the quantity of the auxiliary air, to thereby suppress the fluctuations in engine output.

The assist air passage may bypass the throttle valve disposed in the engine intake system, to inject the assist air in the vicinity of the injection nozzle of the fuel injection valve by a pressure difference between the upstream and downstream sides of the throttle valve. In this case, the quantity of the assist air may be predicted according to an engine's negative suction pressure, to determine a correction quantity of the controlled object according to the prediction.

Since this arrangement determines the correction quantity according to the quantity of assist air that changes in response to the engine's negative suction pressure, the correction quantity will never be too small or too large.

The quantity of intake air to the engine may be corrected in response to the start or stop of supply of assist air by forcibly correcting the opening of the throttle valve, which is disposed in the engine intake system and is driven by a motor.

These and other objects and features of the invention will be described hereinafter in detail by way of preferred embodiments with reference to the accompanying drawings.

DESCRIPTION OF THE PREFERRED EMBODIMENT

Embodiments of the method of and apparatus for controlling assist air in an internal combustion engine according to the present invention will be explained with reference to FIGS. 1 to 8.

Figure 1:
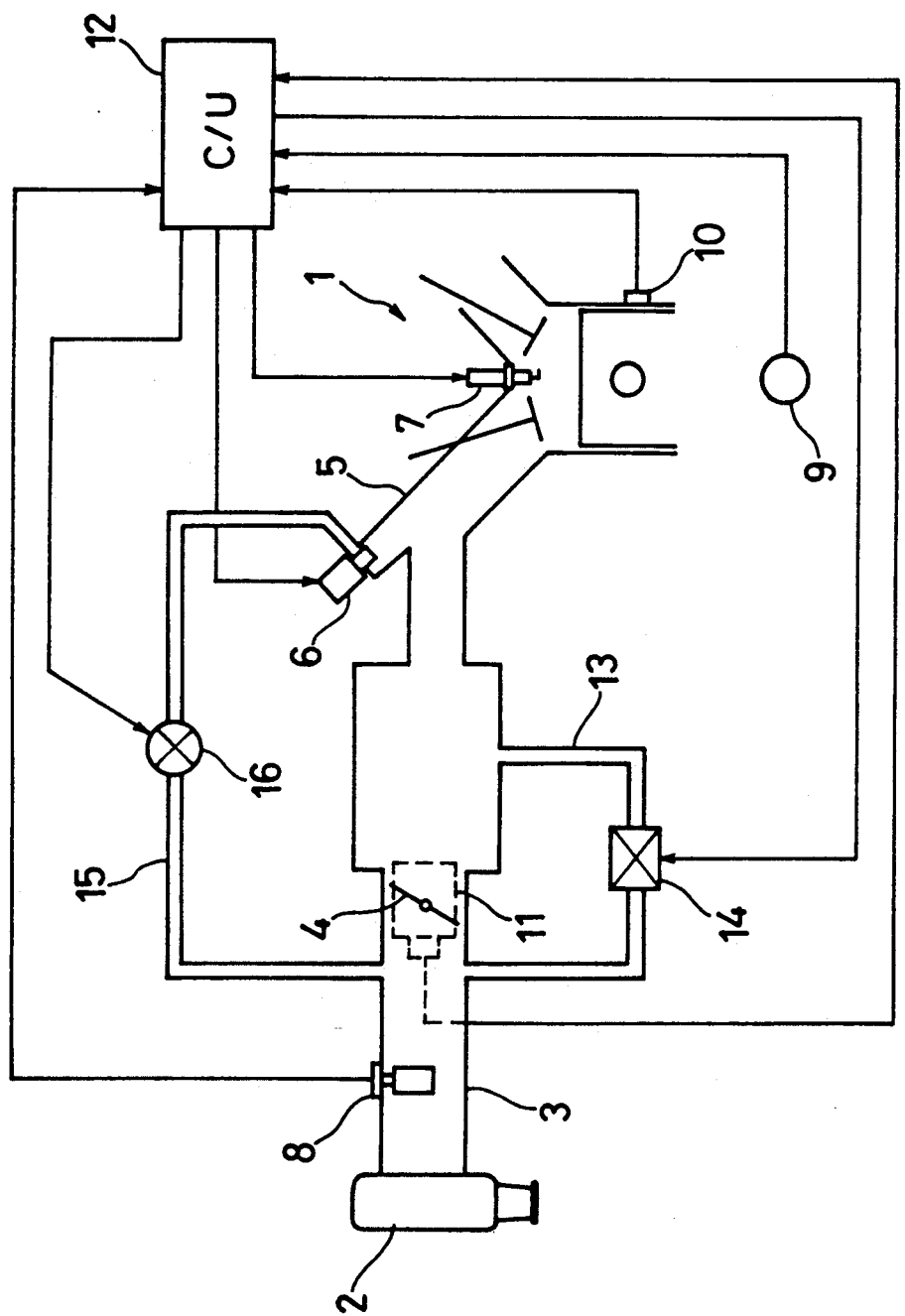
FIG. 1 is a schematic view showing an internal combustion engine according to an embodiment of the invention.

In FIG. 1, an internal combustion engine 1 draws air through an air cleaner 2, and intake duct 3, a throttle valve 4, and an intake manifold 5. The intake manifold 5 has branches each connected to a fuel injection valve 6 of a corresponding cylinder. The fuel injection valve 6 has a solenoid, which is energized and deenergized to open and close the valve. A control unit 12 provides a drive pulse signal whose pulse width corresponds to a fuel quantity, to the solenoid to open the valve 6. A fuel pump (not shown) provides a pressurized fuel, which is adjusted to a predetermined pressure by a pressure regulator and intermittently injected into the engine 1 through the fuel injection valve 6.

Each combustion chamber in the engine 1 has an ignition plug 7, which provides sparks to ignite and burn an air-fuel mixture.

The control unit 12 comprises a microcomputer that includes a CPU, ROM, RAM, A/D converter I/O interface, etc. The control unit 12 receives signals from various sensors, computes a fuel injection quantity suitable for the quantity of intake air to each cylinder, controls operations of each fuel injection valve 6 according to the computed fuel injection quantity, determines a base ignition timing ADV according to detected engine load and engine speed, and controls the ignition timing of each ignition plug 7 according to the ADV.

The sensors include an airflow meter 8 disposed in the intake duct 3, to provide a signal corresponding to a quantity Q of intake air to the engine 1.

A crank angle sensor 9 provides a reference angle signal REF at a predetermined piston position (for example, BTDC 70 degrees CA) in a corresponding cylinder, as well as a unit angle signal POS for every one or two degrees in crank angle. Measuring a period of the reference angle signal REF or the number of the unit angle signals POS for a predetermined period may provide an engine speed N.

A water temperature sensor 10 detects a temperature Tw of cooling water stored in a water jacket of the engine 1.

A throttle sensor 11 has a potentiometer for detecting an opening TVO of the throttle valve 4.

A bypass passage (an auxiliary air passage) 13 bypassing the throttle valve 4 has a solenoid-type idle control valve 14. The idle control valve 14 is an opening adjusting valve having a solenoid coil. A current supplied to the solenoid coil is controlled in response to a duty cycle, to adjust the opening of the valve 14. During an idle operation, the control unit 12 carries out feedback control of the opening of the idle control valve 14, to obtain a target engine speed.

An assist air passage 15 branches from the intake duct 3 on the upstream side of the throttle valve 4, bypasses the throttle valve 4, and opens in the vicinity of an injection nozzle of the fuel injection valve 6. The assist air passage 15 guides assist air with the help of a pressure difference between the upstream and downstream sides of the throttle valve 4 and injects the assist air toward the injection nozzle of the fuel injection valve 6. The assist air hits an injected fuel and atomizes the fuel.

The assist air passage 15 runs in parallel with the intake duct 3 in which the throttle valve 4 is disposed. A usually closed solenoid valve 16 is disposed in the assist air passage 15, to open and close the assist air passage 15. The solenoid valve 16 forms switching means that is turned ON and OFF by the control unit 12 according to, for example, the cooling water temperature Tw corresponding to the temperature of the engine 1. The solenoid valve 16 starts and stops injecting the assist air into a fuel injection area from which the assist air is supplied as part of intake air to the engine 1.

Figure 2:
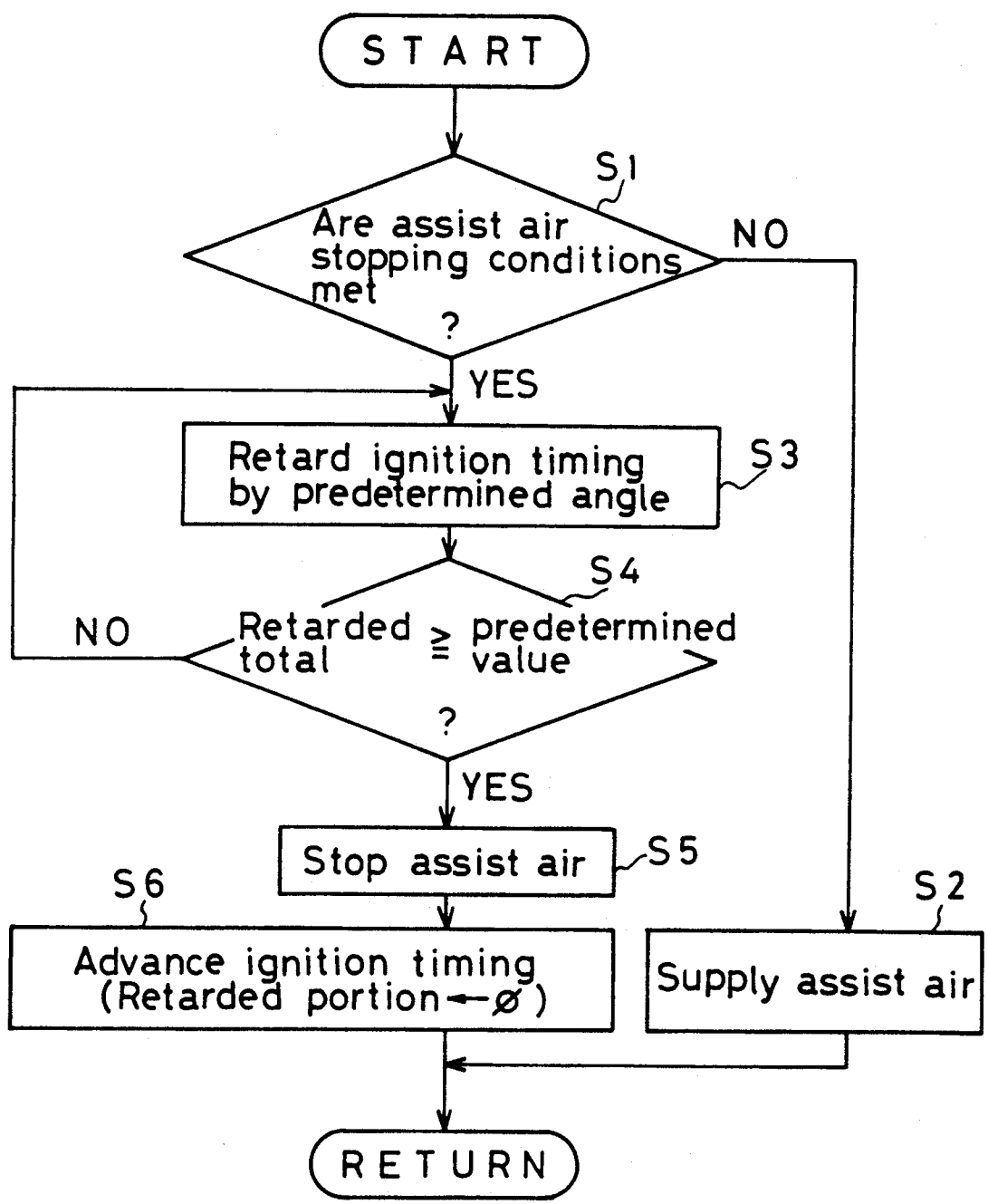
FIG. 2 is a flowchart showing steps of correcting ignition timing according to an embodiment of the invention.

FIG. 2 shows steps of controlling ignition timing according to an embodiment of the invention.

In this embodiment, the CPU of the microcomputer incorporated in the control unit 12 turns ON and OFF the solenoid valve 16, and simultaneously, corrects ignition timing so that the switching control of the solenoid valve 16 may not fluctuate engine output.

Namely, this embodiment employs the ignition timing as a controlled object related to engine output and to be corrected to suppress fluctuations in the engine output when assist air is supplied or stopped. The controlling function of FIG. 2 is achieved by software stored in the control unit 12.

Step S1 determines whether or not conditions for stopping assist air are met.

The assist air is needed when an engine temperature is too low to satisfactorily atomize an injected fuel. The step S1 examines the temperature of the engine according to, for example, the cooling water temperature Tw or an elapsed time after starting the engine, and determines that the conditions for stopping the assist air are true if the engine is sufficiently hot to properly atomize an injected fuel with no assist air. Other conditions may also be adoptable to determine whether the assist air must be supplied or stopped.

If the step S1 determines that the conditions for stopping the assist air are not met, step S2 opens the solenoid valve 16 to supply the assist air.

On the other hand, if the step S1 determines that the assist air stopping conditions stand, step S3 retards ignition timing ADV of the ignition plug 7 by a predetermined angle before turning OFF the solenoid valve 16.

Step S4 determines whether or not a total of the angles retarded in the step S3 is greater than a predetermined value. If the total is smaller than the predetermined value, the process returns to the step S3 to again retard the ignition timing ADV by the predetermined angle. These processes are repeated until the retarded total exceeds the predetermined value.

When the step S4 determines that the total of retardation is greater than the predetermined value, step S5 turns OFF the solenoid valve 16 to stop the assist air.

Step S6 resets the retarded angle of the ignition timing ADV set in the steps S3 and S4 to zero, to return the ignition timing to base ignition timing.

Figure 3:
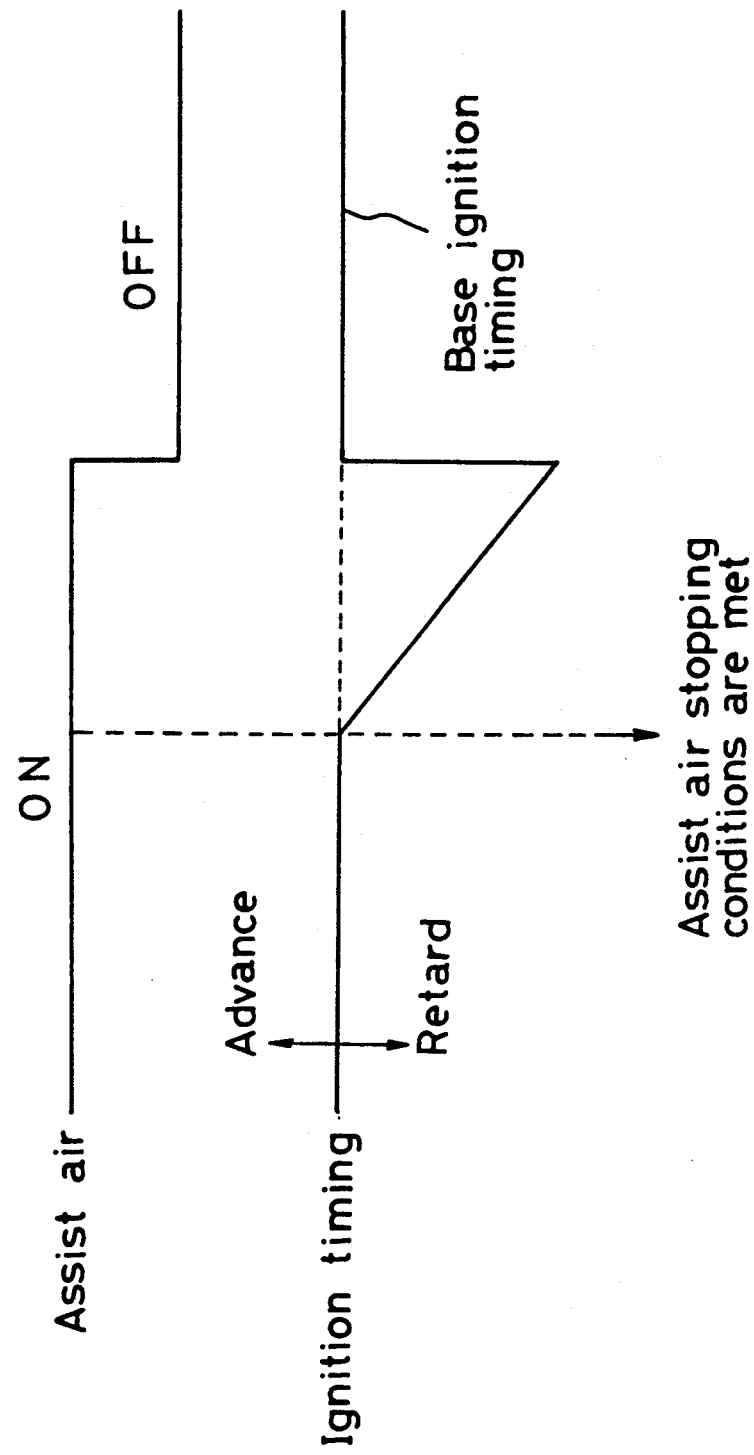
FIG. 3 is a time chart showing the control characteristics of the embodiment of FIG. 2.

In this way, the solenoid valve 16 is not turned OFF immediately after the conditions of stopping the assist air are met. Instead, the ignition timing ADV is firstly retarded by the predetermined angle and then the solenoid valve 16 is turned OFF with the retarded ignition timing ADV being returned to the basic ignition timing (FIG. 3).

When the solenoid valve 16 is turned OFF to stop the assist air, the quantity of intake air to the engine 1 suddenly drops for the portion of the assist air that was being supplied to the engine 1 through the assist air passage 15, thereby suddenly drop engine output. This drop in engine output caused by the stoppage of the assist air will be canceled by the corrected ignition timing. The ignition timing ADV retarded beforehand is advanced to increase engine output when the solenoid valve 16 is turned OFF. Namely, when the solenoid valve 16 is turned OFF, the retarded angle is reset to zero, to advance the ignition timing ADV.

In this way, the ignition timing is corrected in a way to suppress a decrease in engine output when the assist air is stopped, to thereby prevent a sudden drop in engine output caused by the stoppage of the assist air and a shock caused by the drop of the engine output being transmitted to the driver and passengers in a vehicle driven by the engine.

The above embodiment supplies assist air for a period from the start of an engine until the engine is sufficiently heated, and then stops the assist air. The assist air once stopped may be resupplied during the operation of the engine. In this case, the ignition timing is retarded when the assist air is again supplied.

The above embodiment retards ignition timing to suppress fluctuations in engine output when the assist air is supplied or stopped. It is also possible to advance the ignition timing from base ignition timing when the assist air is stopped, and to gradually return it to the base ignition timing.

Figure 4:
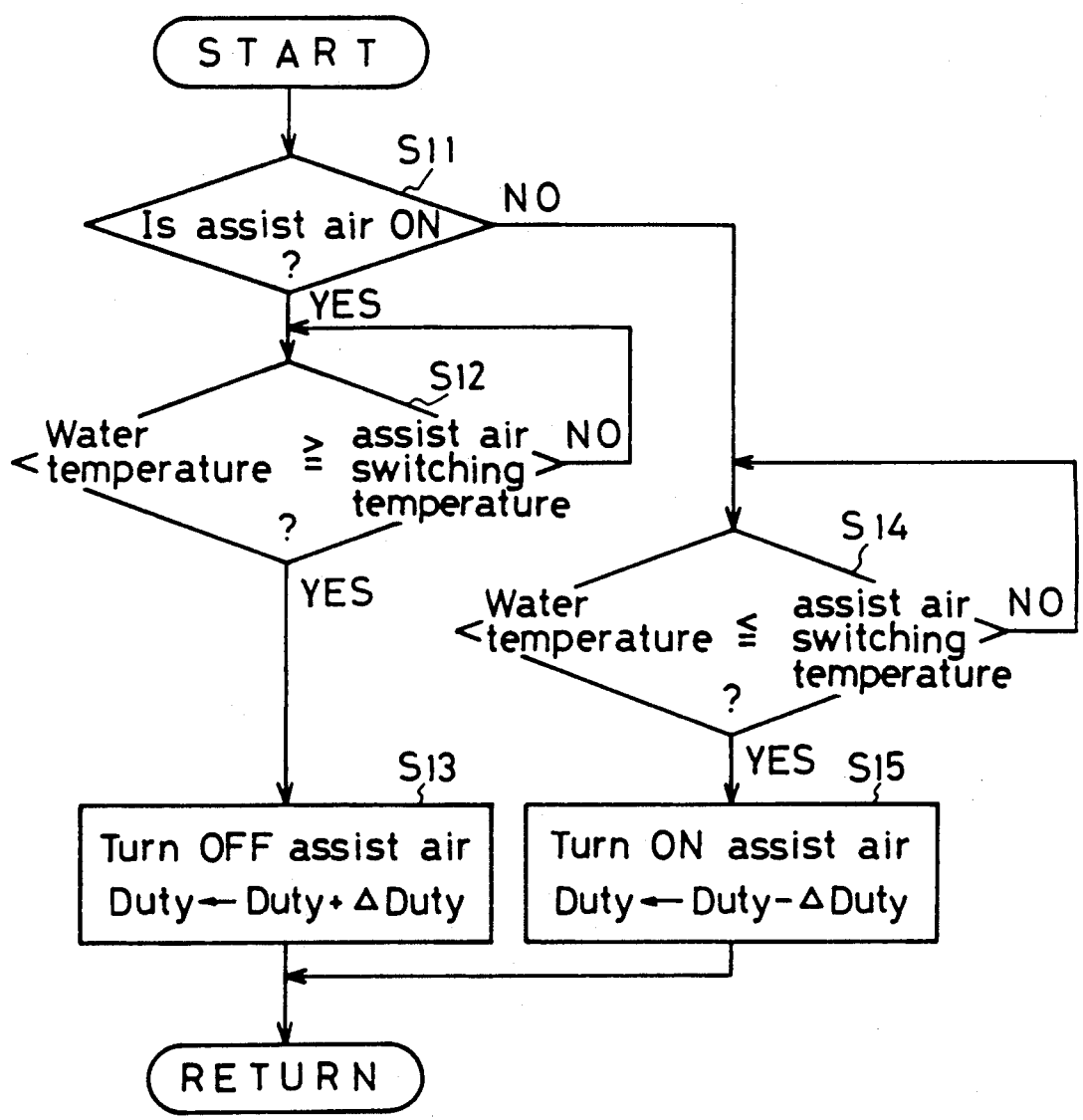
FIG. 4 is a flowchart showing steps of correcting the opening of an idle control valve according to another embodiment of the invention.
Figure 5:
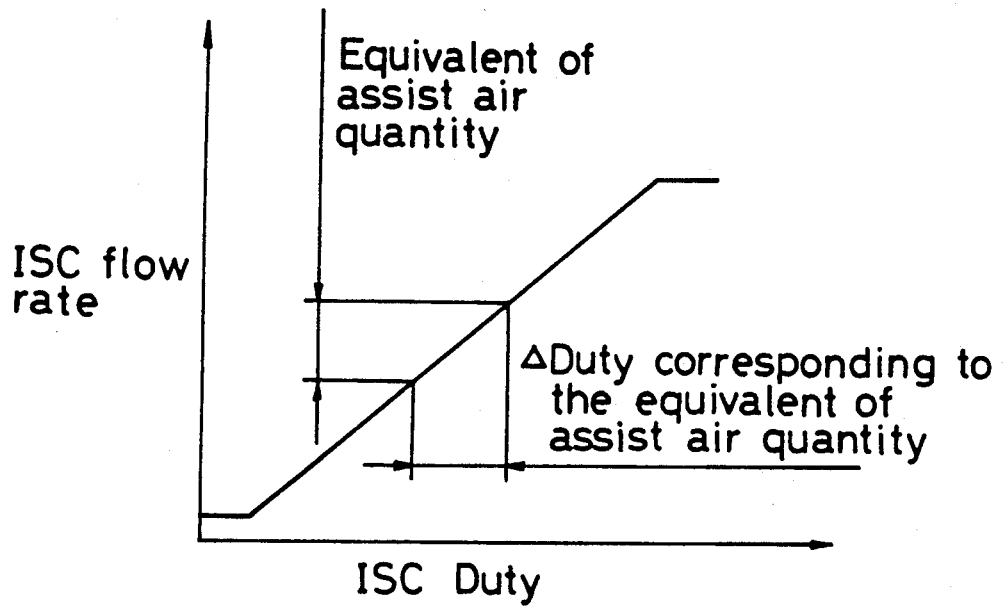
FIG. 5 is a diagram showing relationships between control duties and flow rates of the idle control valve.

FIG. 4 shows steps of correcting the opening of the idle control valve 14 according to another embodiment of the invention.

While the embodiment of FIG. 2 suppresses a sudden change of engine output due to starting or stopping assist air by correcting ignition timing, the embodiment of FIG. 4 forcibly controls the quantity of air supplied to the engine 1 through the bypass passage (auxiliary air passage) 13 used for idling control, to suppress the sudden change in engine output.

Namely, the embodiment of FIG. 4 controls engine output according to an intake air quantity (auxiliary air quantity) as a controlled object. The steps of FIG. 4 are achieved by software stored in the control unit 12.

Step S11 determines whether assist air must be supplied or stopped according to an ON/OFF status of the solenoid valve 16.

When the solenoid valve 16 is ON to supply the assist air, step S12 determines whether or not an actual cooling water temperature Tw is equal to a predetermined switching temperature at which the assist air is stopped.

When the temperature Tw is greater than the switching temperature, step S13 turns OFF the solenoid valve 16 to stop the assist air, and increases an open control duty cycle (an open drive period) "Duty" to be sent to the idle control valve 14 by a present value "ΔDuty". As a result, the opening of the idle control valve 14 is increased by the value "ΔDuty", to increase the quantity of air supplied to the engine 1 through the idle control valve 14.

When the cooling water temperature Tw is lower than the switching temperature in step S14, step S15 turns ON the solenoid valve 16 to start the assist air, and decreases the open control duty cycle "Duty" to be sent to the idle control valve 14 by the preset value "ΔDuty" (FIG. 5), thereby reducing the quantity of air supplied to the engine 1 through the idle control valve 14.

Figure 6:
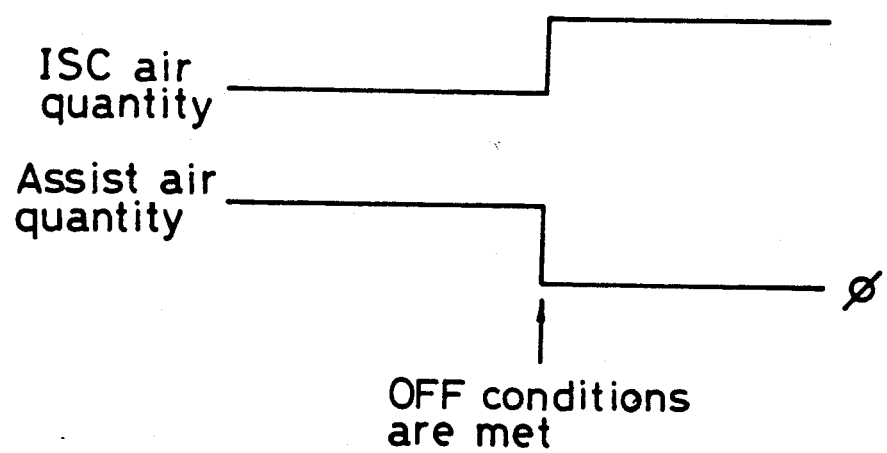
FIG. 6 is a time chart showing the control characteristics of the embodiment of FIG. 4.

In this way, when the solenoid valve 16 is turned ON and OFF to supply and stop the assist air, the quantity of air (ISC air quantity) supplied through the idle control valve 14 is oppositely corrected, so that the quantity of air supplied to the engine 1 is not largely changed by the start and stop of supply of the assist air. In this way, the quantity of air passed through the bypass passage 13 is increased or decreased to avoid a sudden change in engine output caused by the starting and stopping of the supply of assist air (FIG. 6).

It is preferable that the preset value "ΔDuty" corresponds to the total opening area of the assist air passage 15.

Figure 7:
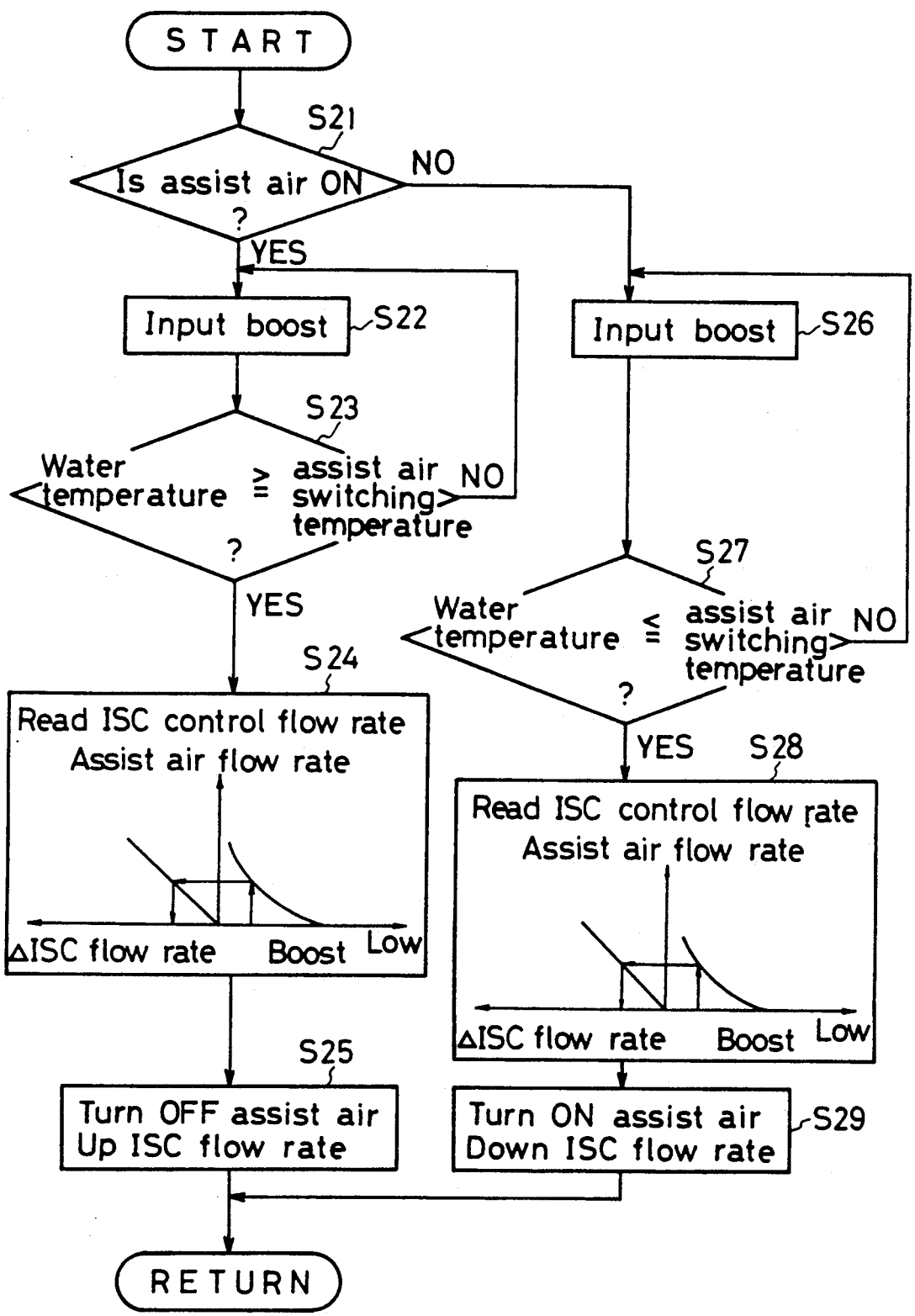
FIG. 7 is a flowchart showing steps of controlling the opening of the idle control valve according to still another embodiment of the invention.

FIG. 7 shows steps of controlling the opening of the idle control valve 14 according to still another embodiment of the invention.

While the embodiment of FIG. 4 increase or decreased the duty "Duty" for the idle control valve 14 by the preset value "ΔDuty" when assist air is supplied or stopped, the embodiment of FIG. 7 predicts the quantity of assist air, which may vary, according to a negative suction pressure of the engine 1, and according to the prediction, increases or decreases the quantity of air passing through the idle control valve 14.

Basically the control steps of FIG. 7 involve supplying and stopping assist air according to a result of comparison of an actual cooling water temperature Tw with the switching temperature, and correcting the opening of the idle control valve 14 in a way not to greatly change the quantity of intake air to the engine 1 due to the starting and stopping of the supply of assist air. This basic operation is the same as the control of FIG. 4, and therefore, its explanation will not be repeated.

The remaining part of the control of FIG. 7 predicts the quantity of air supplied through the assist air passage 15 according to a negative suction (boost) pressure before supplying or stopping the assist air, and sets the predicted quantity as a correction air quantity (ΔISC flow rate) of the idle control valve 14 in steps S24 and S28.

The negative suction pressure may be detected by a negative (boost) pressure sensor, or represented by an intake air quantity (Q/N) per unit revolution obtained from an intake air quantity Q detected by the airflow meter 8 and an engine speed N.

Steps S25 and S29 correct the opening of the idle control valve 14 in an opposite direction by the predicted air quantity of the assist air supplied or stopped. More precisely, a duty cycle corresponding to the predicted assist air quantity is obtained from the negative suction pressure, and the opening of the idle control valve 14 is increased or decreased according to the duty cycle in a way to avoid an increase or a decrease in the intake air quantity due to the starting or stopping of the supply of assist air.

In this way, the quantity of assist air is predicted according to a negative suction pressure in the engine 1, and according to the prediction, the opening of the idle control valve 14 is corrected to avoid an excess or a shortage of the total quantity of intake air to the engine 1 and correctly suppress fluctuations in engine output.

Figure 8:
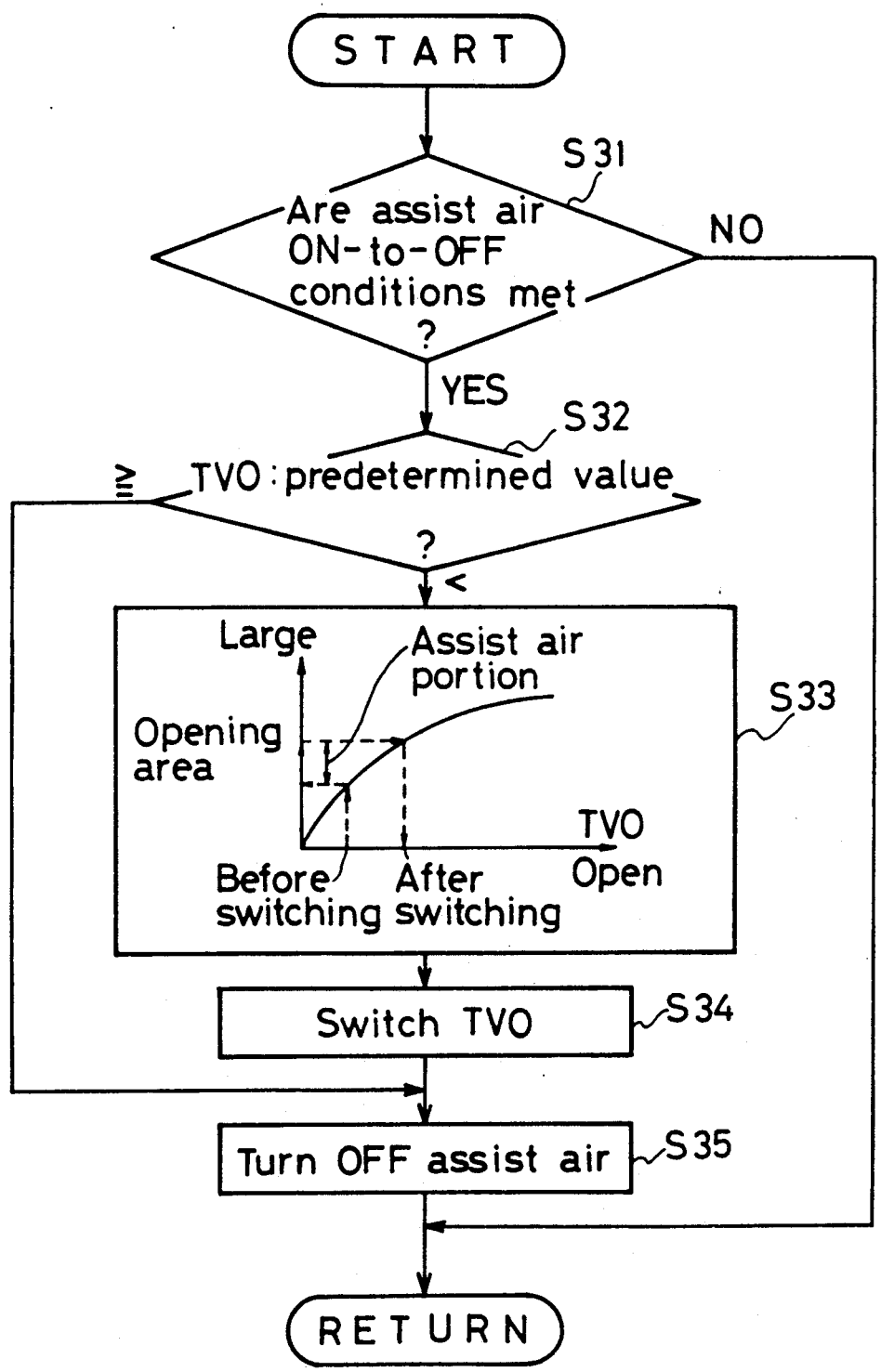
FIG. 8 is a flowchart showing processes of correcting the opening of a throttle valve according to still another embodiment of the invention.

FIG. 8 shows steps of correcting the opening of the throttle valve 4 according to still another embodiment of the invention.

While the embodiment of FIG. 7 adjusts the opening of the idle control valve 14, to suppress fluctuations in the quantity of intake air to the engine 1 caused by assist air supplied or stopped, the embodiment of FIG. 8 adjusts an opening TVO of the throttle valve 4 by controlling, for example, a step motor (an actuator) provided for the throttle valve 4, to suppress the fluctuations of intake air quantity.

Namely, the embodiment of FIG. 8 employs an intake air quantity as a controlled object. The function of FIG. 8 is realized by software stored in the control unit 12.

Step S31 determines whether or not assist air stopping conditions are met.

If the stopping conditions are met, step S32 determines whether or not the opening TVO of the throttle valve 4 is greater than a predetermined value. When the opening TVO of the throttle valve 4 is greater than the predetermined value, it is determined that the intake air quantity cannot be increased for covering the portion of the assist air even if the opening of the throttle valve 4 is increased. Accordingly, the process jumps to step S35 to stop the assist air.

On the other hand, when the opening TVO of the throttle valve 4 is smaller than the predetermined value, step S33 sets a corrected opening based on the present opening TVO, to increase the opening TVO of the throttle valve 4 to cover the total opening area of an injection port of the assist air passage 15.

Step S34 drives the step motor to change the opening of the throttle valve 4 to the corrected opening set in the step S33. Thereafter, step S35 turns OFF the solenoid valve 16 to stop the assist air.

A reduction in the intake air quantity due to the stoppage of the assist air is canceled by the increase of the opening TVO of the throttle valve 4. Namely, the air quantity level before the stoppage of the assist air is maintained to avoid a sudden reduction in engine output and a shock due to the stoppage of the assist air.

The control steps shown in the flowchart of FIG. 8 relate only to stopping assist air. It is possible to control the step motor to forcibly reduce the opening of the throttle valve 4 when the assist air is again supplied.

In the above embodiment, assist air is supplied by a pressure difference between the upstream and downstream sides of the throttle valve 4. Any other means may be employable to start or stop the assist air to flow as part of intake air to the engine 1 under predetermined engine operating conditions. For example, an air pump may be employable for supercharging the assist air.

We claim:

1. An apparatus for controlling assist air in an internal combustion engine, comprising an assist air passage for branching part of intake air as the assist air and injecting the same in the vicinity of an injection nozzle of a fuel injection valve, switching means for starting and stopping the assist air to flow according to engine operating conditions, and output control means for correcting a controlled object related to engine output in a way to suppress a fluctuation in engine output when the switching means starts and stops supplying the assist air.

2. The apparatus for controlling assist air in an internal combustion engine according to claim 1, wherein the assist air passage is an intake passage bypassing a throttle valve disposed in an engine intake system, for injecting the assist air in the vicinity of the injection nozzle of the fuel injection valve by a pressure difference between the upstream and downstream sides of the throttle valve.

3. The apparatus for controlling assist air in an internal combustion engine according to claim 1, wherein the switching means starts and stops supplying the assist air according to an engine temperature.

4. The apparatus for controlling assist air in an internal combustion engine according to claim 1, wherein the controlled object is ignition timing of the engine.

5. The apparatus for controlling assist air in an internal combustion engine according to claim 1, wherein the controlled object is ignition timing of the engine, and the output control means forcibly retards the ignition timing of the engine by a predetermined angle before the assist air is stopped, and resets the retarded portions to zero when the assist air is stopped, thereby suppressing fluctuations in engine output.

6. The apparatus for controlling assist air in an internal combustion engine according to claim 1, wherein the controlled object is the quantity of intake air to the engine.

7. The apparatus of controlling assist air in an internal combustion engine according to claim 1, wherein the internal combustion engine has an auxiliary air passage that is independent of the assist air passage and bypasses the throttle valve disposed in the engine intake system, and a control valve for changing the quantity of auxiliary air supplied to the engine through the auxiliary air passage, in response to engine operating conditions, and wherein the output control means forcibly corrects the opening of the control valve to correct an auxiliary air quantity as the controlled object when supply of the assist air is started or stopped.

8. The apparatus for controlling assist air in an internal combustion engine according to claim 1, wherein the assist air passage is an intake passage bypassing the throttle valve disposed in the engine intake system, for injecting the assist air in the vicinity of the injection nozzle of the fuel injection valve by a pressure difference between the upstream and downstream sides of the throttle valve, and wherein the output control means predicts the quantity of the assist air according to a negative suction pressure of the engine, and according to the prediction, determines a correction quantity of the controlled object.

9. The apparatus for controlling assist air in an internal combustion engine according to claim 1, wherein the output control means corrects the quantity of intake air to the engine as the controlled object by forcibly correcting the opening of the throttle valve, which is disposed in the engine intake system and driven by a motor.

10. A method of controlling assist air in an internal combustion engine, involving an assist air passage for branching part of intake air as the assist air and injecting the same in the vicinity of an injection nozzle of a fuel injection valve, the method comprising the steps of starting and stopping the supply of assist air through the assist air passage in response to engine operating conditions, and correcting a controlled object related to engine output in a way to suppress a fluctuation in engine output when starting and stopping to supply the assist air.

11. The method of controlling assist air in an internal combustion engine according to claim 10, wherein the assist air passage is an intake passage bypassing throttle valve disposed in an engine intake system, for injecting the assist air in the vicinity of the injection nozzle of the fuel injection valve by a pressure difference between the upstream and downstream sides of the throttle valve.

12. The method of controlling assist air in an internal combustion engine according to claim 10, wherein the assist air starting and stopping step starts and stops supplying the assist air according to an engine temperature.

13. The method of controlling assist air in an internal combustion engine according to claim 10, wherein the controlled object is ignition timing of the engine.

14. The method of controlling assist air in an internal combustion engine according to claim 10, wherein the controlled object in the output correcting step is ignition timing of the engine, and the output correcting step forcibly retards the ignition timing of the engine by a predetermined angle before the assist air is stopped, and resets the retarded portion to zero when the assist air is stopped, thereby suppressing fluctuations in engine output.

15. The method of controlling assist air in an internal combustion engine according to claim 10, wherein the controlled object is the quantity of intake air to the engine.

16. The method of controlling assist air in an internal combustion engine according to claim 10, wherein the internal combustion engine has an auxiliary air passage that is independent of the assist air passage and bypasses the throttle valve disposed in the engine intake system, and a control valve for changing the quantity of auxiliary air supplied to the engine through the auxiliary air passage, in response to engine operating conditions, and wherein the output correcting step forcibly corrects the opening of the control valve to correct an auxiliary air quantity as the controlled object when supply of the assist air is started or stopped.

17. The method of controlling assist air in an internal combustion engine according to claim 10, wherein the assist air passage is an intake passage bypassing the throttle valve disposed in the engine intake system, for injecting the assist air in the vicinity of the injection nozzle of the fuel injection valve by a pressure difference between the upstream and downstream sides of the throttle valve, and wherein the output correcting step includes a step of predicting the quantity of the assist air according to a negative suction pressure of the engine and a step of determining a correction quantity of the controlled object according to the prediction.

18. The method of controlling assist air in an internal combustion engine according to claim 10, wherein the output correcting step corrects the quantity of intake air to the engine as the controlled object by forcibly correcting the opening of the throttle valve, which is disposed in the engine intake system and is driven by a motor.

* * * * *